United States Patent
Li et al.

(10) Patent No.: US 10,416,357 B2
(45) Date of Patent: *Sep. 17, 2019

(54) METHOD FOR ADJUSTING A FOCAL LENGTH OF A LIQUID LENS

(71) Applicants: Tsinghua University, Beijing (CN); HON HAI PRECISION INDUSTRY CO., LTD., New Taipei (TW)

(72) Inventors: Jie Li, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,278

(22) Filed: Mar. 21, 2018

(65) Prior Publication Data

US 2018/0210117 A1     Jul. 26, 2018

Related U.S. Application Data

(63) Continuation of application No. 13/908,109, filed on Jun. 3, 2013, now Pat. No. 10,234,605.

(30) Foreign Application Priority Data

Jun. 4, 2012 (CN) .......................... 2012 1 0180562

(51) Int. Cl.
*G02B 3/12* (2006.01)
*G02B 3/14* (2006.01)
*B82Y 20/00* (2011.01)

(52) U.S. Cl.
CPC ................. *G02B 3/12* (2013.01); *G02B 3/14* (2013.01); *B82Y 20/00* (2013.01)

(58) Field of Classification Search
CPC .......... G02B 3/12; G02B 3/14; G02B 26/004; G02B 26/005; G02C 7/085
USPC .................................................. 359/665–667
See application file for complete search history.

(56) References Cited

U.S. PATENT DOCUMENTS

| 4,865,426 A * | 9/1989 | Matsuoka ................ G02B 3/12 359/289 |
| 7,311,398 B2 | 12/2007 | Kuiper et al. |
| 7,408,717 B2 * | 8/2008 | Renders ............... G02B 26/005 359/665 |

(Continued)

OTHER PUBLICATIONS

Lee, June Kyoo, et al. "Variable-Focus Liquid Lens Based on a Laterally-Integrated Thermopneumatic Actuator." Journal of the Optical Society of Korea, vol. 16, No. 1, 2012, pp. 22-28., doi:10.3807/josk.2012.16.1.022.*

(Continued)

*Primary Examiner* — Zachary W Wilkes
(74) *Attorney, Agent, or Firm* — ScienBiziP, P.C.

(57) ABSTRACT

A method for adjusting a focal length of a liquid lens is related. The liquid lens includes a sealed shell, a liquid material, a transparent carbon nanotube structure within the liquid material, and a first electrode and a second electrode. A voltage is applied to the carbon nanotube structure to cause rapid heating, which is transferred to the liquid material to change the density thereof, and the refractive index of the liquid material is thus changed. Thus, the focal length of the liquid lens is changed.

19 Claims, 6 Drawing Sheets

(56) References Cited

U.S. PATENT DOCUMENTS

| | | |
|---|---|---|
| 7,499,223 B2 | 3/2009 | Berge et al. |
| 7,940,467 B2 | 5/2011 | Berge et al. |
| 8,649,104 B2 | 2/2014 | Koga |
| 8,837,054 B2 | 9/2014 | Li et al. |
| 10,234,605 B2 * | 3/2019 | Li .......................... G02B 3/14 |
| 2009/0086331 A1 * | 4/2009 | Gunasekaran ........... G02B 1/06 359/666 |
| 2010/0118414 A1 | 5/2010 | Bolis |

OTHER PUBLICATIONS

Yoon, Y.-H., et al. "Transparent Film Heater Using Single-Walled Carbon Nanotubes." Advanced Materials, vol. 19, No. 23, 2007, pp. 4284-4287., doi:10.1002/adma.200701173.*

Tomlin, S G. "Optical Reflection and Transmission Formulae for Thin Films." Brit. J. Appl. Phys., vol. 1, ser. 2, 1968, pp. 1667-1671.

Yanagi, Kazuhiro, et al. "Colors of Carbon Nanotubes." Diamond and Related Materials, vol. 18, 2009, pp. 935-939.

Zhang, Mei, et al. "Strong, Transparent, Multifunctional, Carbon Nanotube Sheets." Science, American Association for the Advancement of Science, Aug. 19, 2005.

Wu, ZhuangChun, et al. "Transparent, Conductive Carbon Nanotube Films." Science; vol. 305 (Aug. 2004): pp. 1273-1276. Print.

* cited by examiner

METHOD FOR ADJUSTING A FOCAL LENGTH OF A LIQUID LENS

RELATED APPLICATIONS

This application is a continuation application of U.S. patent application Ser. No. 13/908,109, filed on Jun. 3, 2013, entitled "LIQUID LENS," which claims all benefits accruing under 35 U.S.C. § 119 from China Patent Application No. 201210180562.X, filed on Jun. 4, 2012 in the China Intellectual Property Office, entire contents of which is hereby incorporated by reference.

BACKGROUND

1. Technical Field

The present disclosure relates to liquid lens, and particularly to a liquid lens with a carbon nanotube structure.

2. Description of Related Art

By controlling the meniscus (the surface of the liquid, a liquid lens uses one or more fluids to create a lens of infinitely variable shapes in relation to a focal length and other optical properties without any moving parts. There are two primary types of liquid lenses—transmissive and reflective, which are not to be confused with liquid-formed lenses that are created by placing a drop of plastic or epoxy on a surface and then allowed to be hardened into a lens shape.

According to different structures and principles, liquid lenses can be roughly classified into three types: (1) double liquid layer liquid lens based on electrowetting principle; (2) single liquid layer liquid lens which shape can be changed by mechanical force; and (3) liquid crystal lens which reflective ratio can be changed by applying an electric field to change the alignment of the liquid crystals of the liquid crystal lens.

Compared with traditional variable-focus lenses, the liquid lens has less mechanical structures. Liquid lenses are small, quick responding, energy efficient, and durable. Therefore, liquid lenses have been widely applied in the fields of mobile phone, digital camera, as electronically controllable variable focus systems.

However, double liquid layer liquid lenses usually have complex structures, and high costs. Single liquid layer liquid lenses are hard to control, and have poor stabilities. Liquid crystal lenses having high costs may limit the applications of the liquid crystal lenses.

Therefore, a liquid lens of a lower cost, higher precision, higher efficiency, and easies to control may be desired within the art.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" exemplary embodiment in this disclosure are not necessarily to the same exemplary embodiment, and such references mean "at least one."

Figure 1:
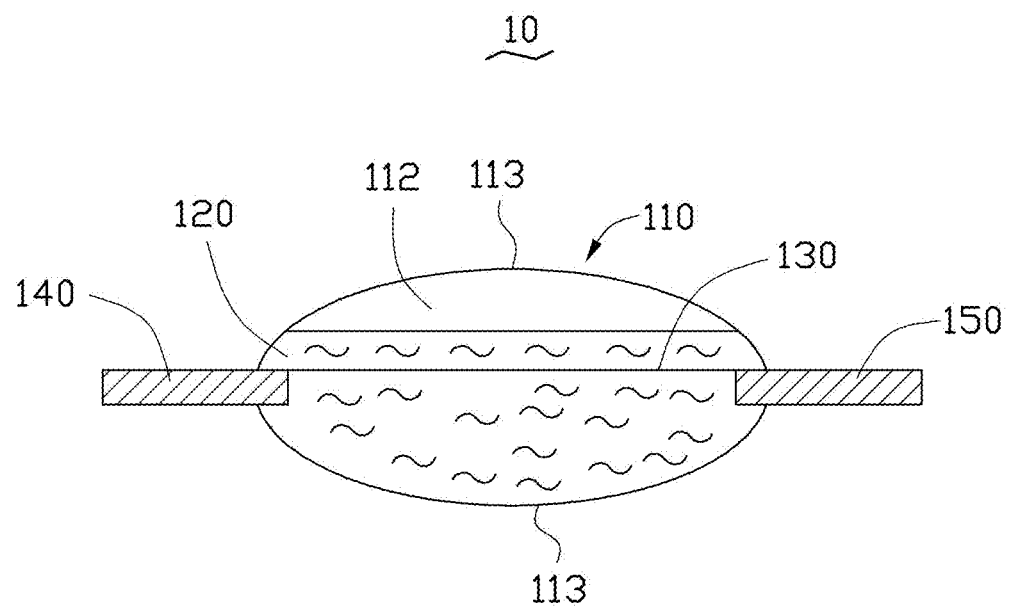
FIG. 1 shows a cross-sectional view of a liquid lens of one exemplary embodiment.
Figure 2:
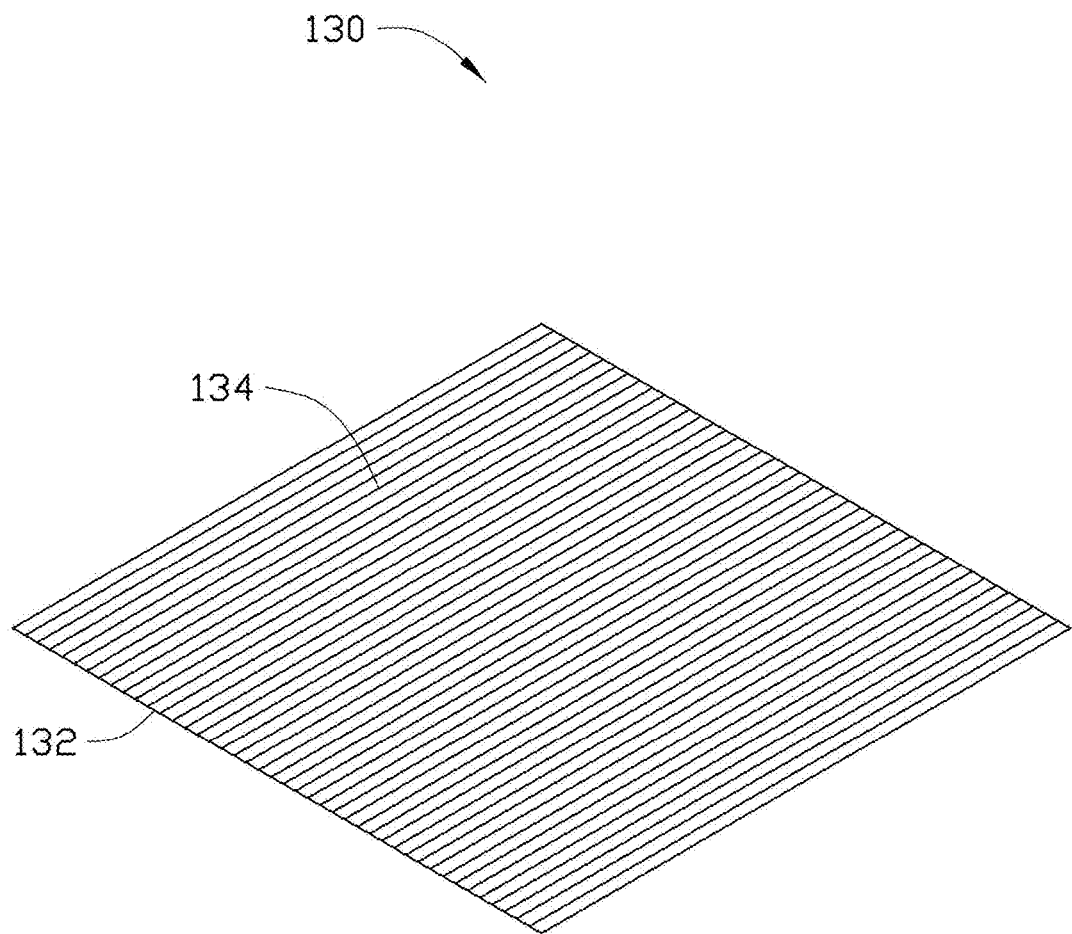
FIG. 2 shows one carbon nanotube structure of one exemplary embodiment of the liquid lens of FIG. 1.

FIG. 1 is one exemplary embodiment of a liquid lens 10. The liquid lens 10 includes a sealed shell 110, a liquid material 120, a carbon nanotube structure 130, a first electrode 140 and a second electrode 150. The liquid material 120 and the carbon nanotube structure 130 are sealed in the sealed shell 110, and in contact with each other. About 50% to 100% of the volume within the sealed shell 110 is filled with the liquid material 120. When the sealed shell 100 is not completely filled with the liquid material 120, the remaining volume in the sealed shell 100 is occupied by an air space 112 defined in the sealed shell 110. In the present disclosure, the air space 112 occupies about 0% to about 50% of the volume of the sealed shell 110. In one exemplary embodiment, the air space 112 occupies about 10% to about 50% of the volume of the sealed shell 110. The first electrode 140 and the second electrode 150 are separately located at two opposite sides of the sealed shell 110, and are electrically connected to the carbon nanotube structure 130. A voltage can be applied to the carbon nantotube structure 130 via the first electrode 140 and the second electrode 150 to induce heating of the liquid material 120.

The sealed shell 110 holds the liquid material 120 and the carbon nanotube structure 130. The sealed shell 110 is transparent and made of rigid materials, such as glass, quartz, plastic or resin. In one exemplary embodiment, the sealed shell 110 is made of a transparent non-conductive hard glass. The shape of the sealed shell 110 is variable, and the sealed shell 110 can be used to focus light. In one exemplary embodiment, the sealed shell 110 has a convex shape, and includes two opposite convex surfaces 113 opposite to each other. The diameter of the sealed shell 110 can be in a range from about 10 millimeter to about 10 centimeters. The thickness of the sealed shell 110 can be in a range from about 5 millimeters to about 1 centimeter. In one exemplary embodiment, the diameter of the convex shaped sealed shell 110 is about 1 centimeter, and the thickness of the sealed shell 110 is about 3 millimeters.

The material of the liquid material 120 is not limited to a single material or type of material, and the resistivity of the liquid material 120 is greater than the resistivity of the carbon nanotube structure 130. The carbon nanotube structure 130 has a low heat capacity per unit area, which is less than or equal to about $1.7 \times 10^{-6}$ J/cm$^2$*K. The temperature of carbon nanotube structure 130 changes rapidly in response to voltage changes applied to the carbon nanotube structure 130. The focal length of the liquid lens 10 changes with the voltage applied on the carbon nanotube structure 130. Thus, the response speed of the liquid lens 10 is almost instantaneous. In one exemplary embodiment, the resistivity of the liquid material 120 is greater than 0.01 Ohm*M.

The liquid material 120 can be a solution of non-electrolyte, water, or organic solvent. The water can be pure water, tap water, or sea water. The organic solvent can be methanol, ethanol or acetone. In one exemplary embodiment, liquid material 120 is pure water. The refractive index of liquid material 120 is sensitive to temperature or density change.

The first electrode 140 and the second electrode 150 are in electrical contact with the carbon nanotube structure 130, and a voltage can be applied to the carbon nanotube structure 130 via the first electrode 140 and the second electrode 150. The first electrode 140 and the second electrode 150 are made of conductive material. The shapes of the first electrode 140 and the second electrode 150 are not limited to the exemplary embodiments and can be lamellar, rod, wire, and blocklike, among other shapes. A material of the first electrode 140 and the second electrode 150 can be metal, conductive adhesive, carbon nanotube, and indium tin oxide, among other conductive materials. In one exemplary embodiment, the first electrode 140 and the second electrode 150 are lamellar metal.

The carbon nanotube structure 130 is transparent and free-standing sheet structure which is also flexible. The carbon nanotube structure 130 can be embedded in the liquid material 120 and supported by the first electrode 140 and the second electrode 150. In one exemplary embodiment, opposite sides of carbon nanotube structure 130 are respectively mounted on the first electrode 140 and the second electrode 150 by a conductive adhesive. The size of the carbon nanotube structure 130 is not limited, provided there is complete physical contact with the liquid material 120. The thickness of the carbon nanotube structure can be in a range from about 10 nanometers to about 50 micrometers. The heat capacity per unit area of the carbon nanotube structure 130 can be less than $2\times10^{-4}$ J/cm$^2$*K. In one exemplary embodiment, the heat capacity per unit area of the carbon nanotube structure 130 is less than or equal to about $1.7\times10^{-6}$ J/cm$^2$*K.

Referring to FIG. 2 to FIG. 5, the carbon nanotube structure 130 can be a single drawn carbon nanotube film 132, or more than one drawn carbon nanotube films 132 stacked on each other. The drawn carbon nanotube film 132 can be obtained by pulling from a carbon nanotube array. The drawn carbon nanotube film 132 includes a plurality of carbon nanotubes joined end to end by van der Waals attractive force along a same direction. The drawn carbon nanotube film 132 includes a plurality of successive and ordered carbon nanotubes 134 joined end-to-end lengthwise by van der Waals attractive force therebetween. The thickness of the drawn carbon nanotube film 132 can be in a range from about 10 nanometers to about 500 nanometers. The drawn carbon nanotube film 132 is a free-standing film. The term "free-standing" includes, but is not limited to, a structure that does not require support from or by a substrate or other foundation and can sustain its own weight when it is hoisted by a portion thereof without damage to the structural integrity of the whole film.

Figure 3:
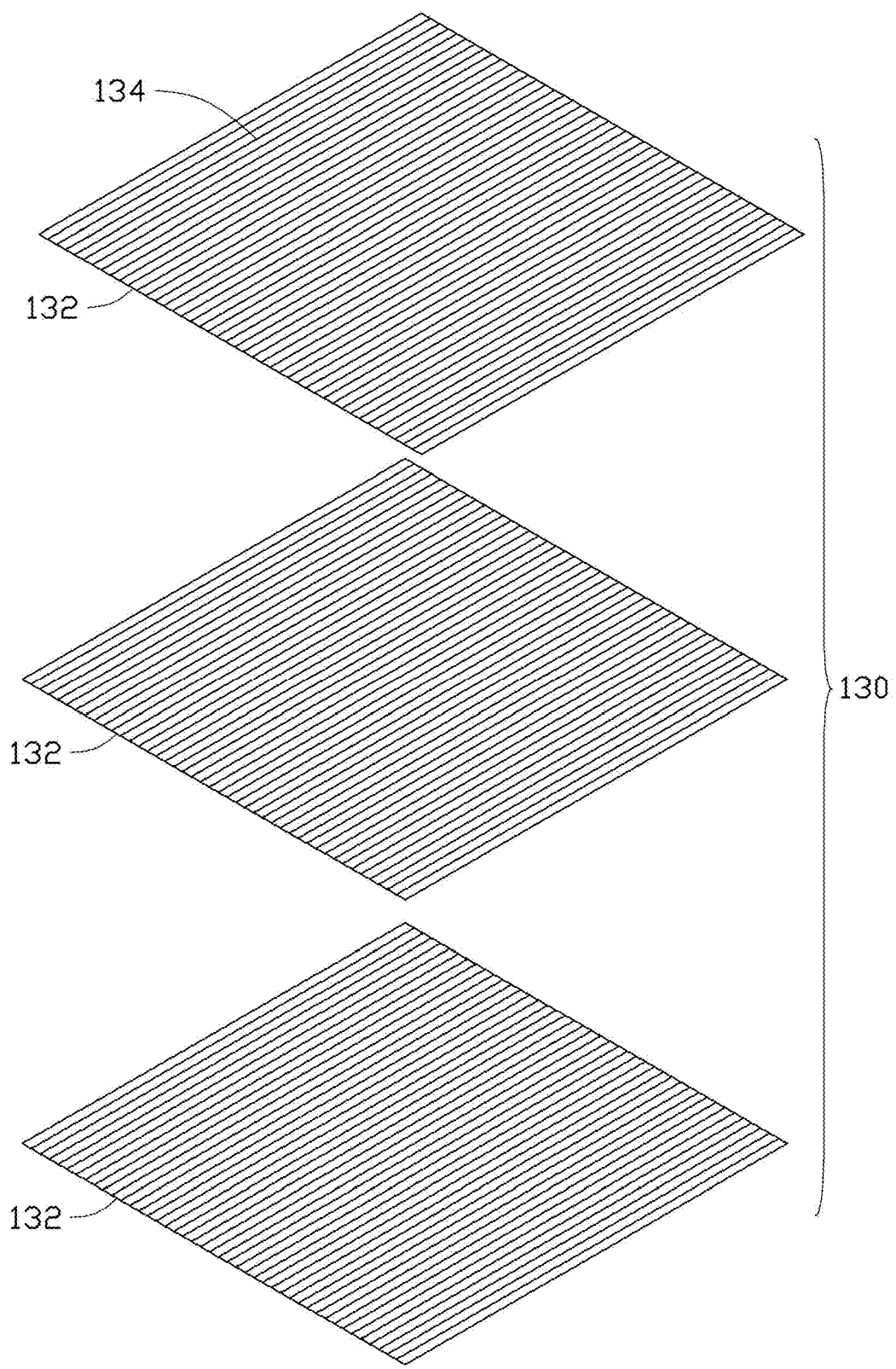
FIG. 3 shows other carbon nanotube structures of another exemplary embodiment of the liquid lens of FIG. 1.
Figure 4:
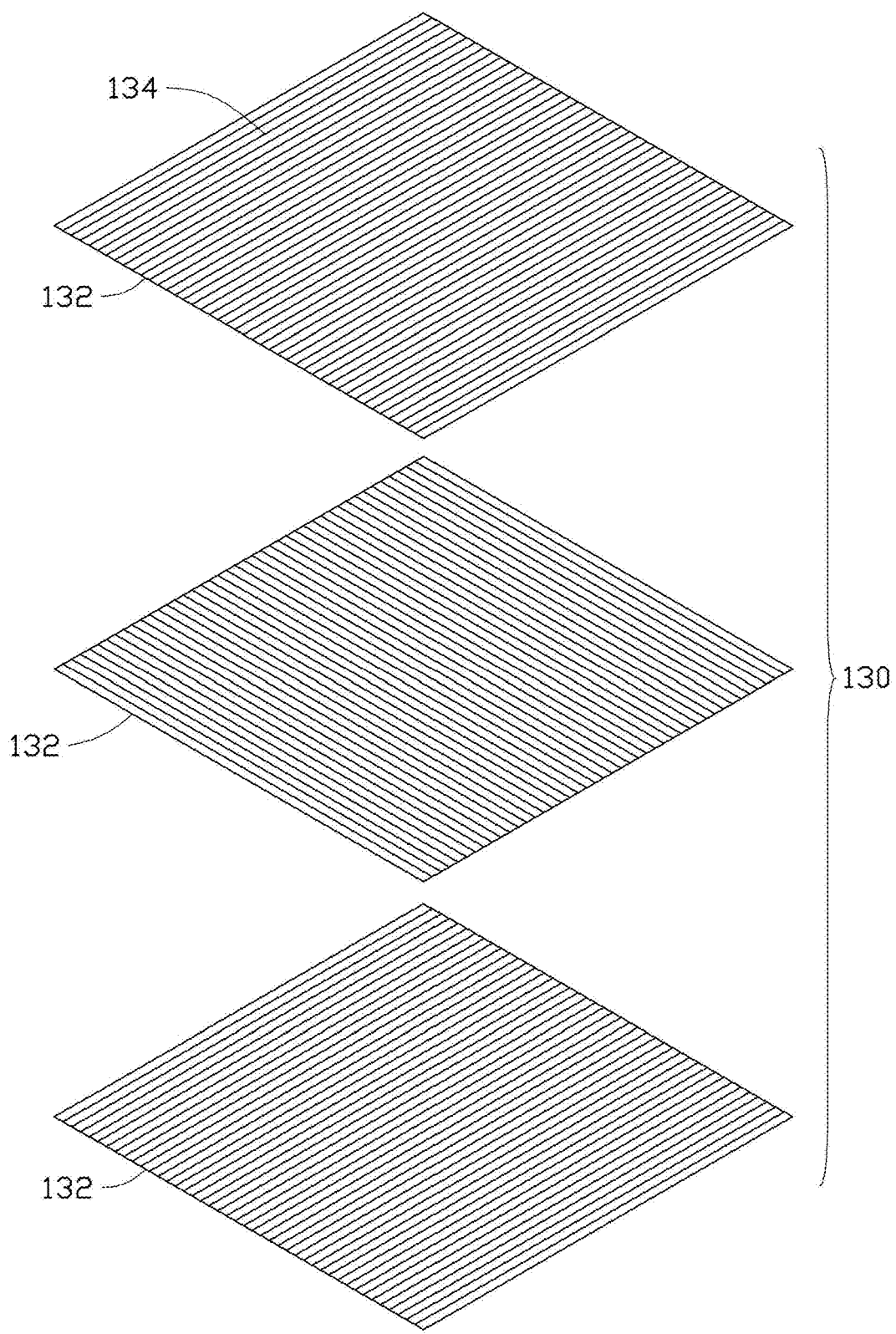
FIG. 4 shows carbon nanotube structures of another exemplary embodiment of the liquid lens of FIG. 1.
Figure 5:
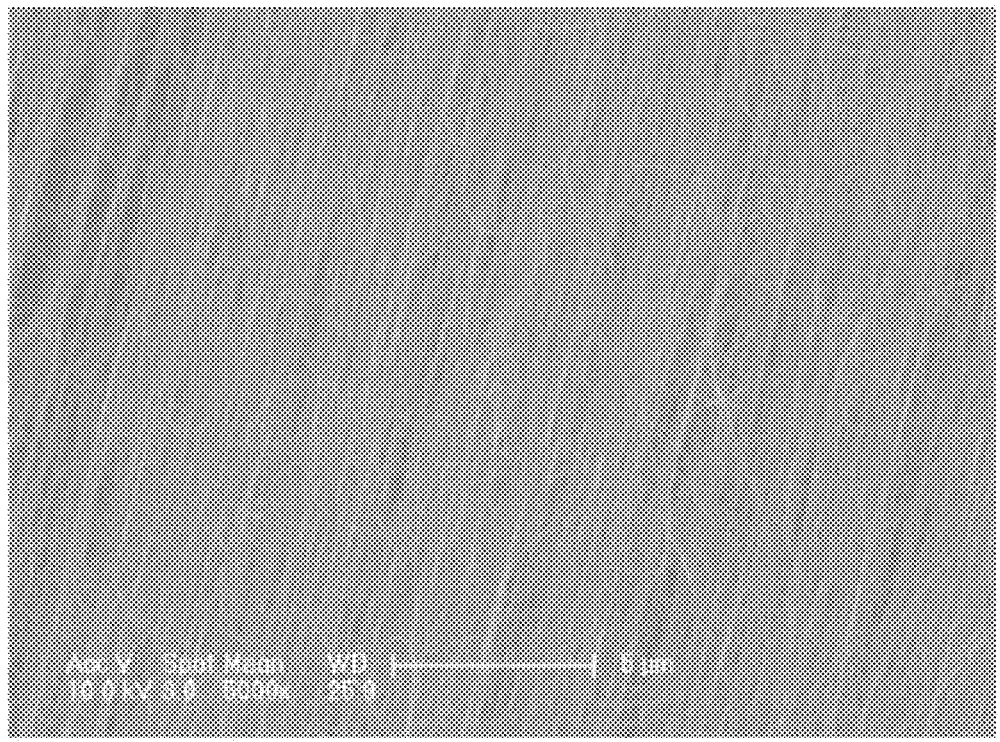
FIG. 5 is a Scanning Electron Microscope (SEM) image of a drawn carbon nanotube film used in the liquid lens of FIG. 1.

The carbon nanotube structure 130 can include a plurality of carbon nanotube drawn films 132 stacked with each other. Adjacent drawn carbon nanotube films 132 combine by just the van der Waals attractive force therebetween. An angle between the aligned directions of the carbon nanotubes in two adjacent carbon nanotube films 132 can range from about 0 degrees to about 90 degrees. When the carbon nanotube structure 130 includes more than one drawn carbon nanotube films 132 stacked on each other, the mechanical strength and toughness of the carbon nanotube structure 130 is increases, but the transparency of the carbon nanotube structure 130 is decreased. Therefore, the number of layers of the carbon nanotube films 132 should limited to 10 layers. In one exemplary embodiment, the carbon nanotube structure 130 includes three layers of drawn carbon nanotube films 132. Referring to FIG. 3, in one exemplary embodiment, the carbon nanotube structure 130 includes three layers of drawn carbon nanotube films 132. The angle between the aligned directions of the carbon nanotubes in two adjacent carbon nanotube films 132 is 0 degrees. Referring to FIG. 4, in one exemplary embodiment, the angle between the aligned directions of the carbon nanotubes in two adjacent carbon nanotube films 132 is 90 degrees.

The carbon nanotubes 134 of the drawn carbon nanotube film 132 are aligned lengthwise along a same direction. The carbon nanotubes 134 of at least one drawn carbon nanotube film 132 of the carbon nanotube structure 130 are aligned in line from the first electrode 140 to the second electrode 150. The high electrical conductivity of the carbon nanotubes 134 along the lengthwise direction promote the efficient working of the liquid lens 10.

Figure 6:
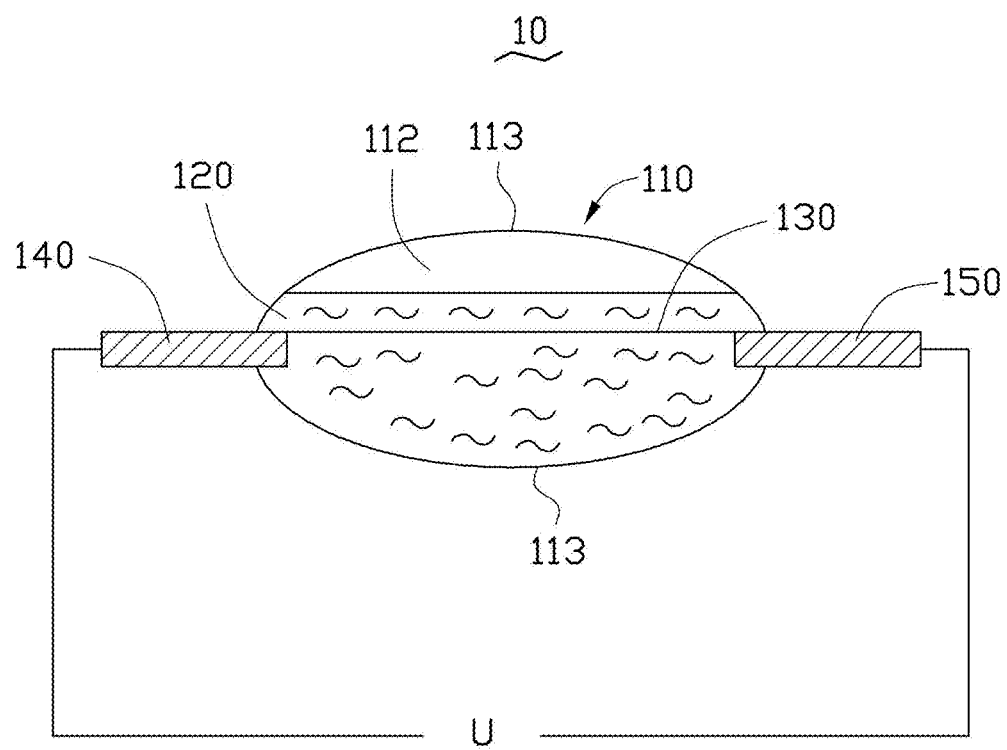
FIG. 6 shows a cross-sectional view of the liquid lens of FIG. 1 in an application.

The liquid lens 10 has a fixed focal length when there is no voltage applied on the carbon nanotube structure 130. Referring to FIG. 6, when a voltage is applied on the carbon nanotube structure 130, the liquid material 120 is heated, and the density of the liquid material 120 changes with the temperature. The refractive index of the liquid material 120 changes with the change in density. Therefore, the focal length of the liquid lens 100 can be adjusted by changing the voltage applied to the carbon nanotube structure 130.

It is to be understood that the above-described exemplary embodiments are intended to illustrate rather than limit the disclosure. Variations may be made to the exemplary embodiments without departing from the spirit of the disclosure as claimed. It is understood that any element of any one exemplary embodiment disclosed can be incorporated with any other exemplary embodiment. The above-described exemplary embodiments illustrate the scope of the disclosure but do not restrict the scope of the disclosure.

What is claimed is:

1. A method for adjusting a focal length of a liquid lens comprising a sealed shell, a liquid material, a carbon nanotube structure, a first electrode and a second electrode, and a gaseous material sealed inside the sealed shell; the liquid material and the carbon nanotube structure are sealed inside the sealed shell and in contact with each other, the first electrode and the second electrode are electrically connected to the carbon nanotube structure and separated from each other by the carbon nanotube structure, and the gaseous material occupies approximately 10% to approximately 50% of a total volume inside the sealed shell; the method comprising:

heating the liquid material by the carbon nanotube structure.

2. The method of claim 1, wherein heating the liquid material by the carbon nanotube structure comprising applying a voltage to the carbon nanotube structure via the first electrode and the second electrode.

3. The method of claim 1, wherein heating the liquid material by the carbon nanotube structure comprises changing a density and a refractive index of the liquid material.

4. The method of claim 1, wherein the carbon nanotube structure is immersed in the liquid material.

5. The method of claim 1, wherein a resistivity of the liquid material is greater than a resistivity of the carbon nanotube structure.

6. The method of claim 1, wherein the carbon nanotube structure comprises a drawn carbon nanotube film.

7. The method of claim 6, wherein the drawn carbon nanotube film comprises a plurality of carbon nanotubes aligned along a same direction.

8. The method of claim 6, wherein a thickness of the drawn carbon nanotube film ranges from about 10 nanometers to about 500 nanometers.

9. A method for adjusting a focal length of a liquid lens comprising a sealed shell, a liquid material, a carbon nanotube structure, a first electrode and a second electrode, and a gaseous material sealed inside the sealed shell; the liquid material and the carbon nanotube structure are sealed inside the sealed shell and in contact with each other, the first electrode and the second electrode are electrically connected to the carbon nanotube structure and separated from each other by the carbon nanotube structure, and the gaseous material occupies approximately 10% to approximately 50% of a total volume inside the sealed shell; the method comprising:

heating the liquid material by applying a voltage to the carbon nanotube structure via the first electrode and the second electrode.

10. The method of claim 9, wherein a density and a refractive index of the liquid material is changed when the liquid material is heated.

11. The method of claim 9, wherein the carbon nanotube structure is immersed in the liquid material.

12. The method of claim 9, wherein a resistivity of the liquid material is greater than a resistivity of the carbon nanotube structure.

13. The method of claim 9, wherein the carbon nanotube structure comprises a drawn carbon nanotube film comprising a plurality of carbon nanotubes aligned along a same direction.

14. The method of claim 13, wherein a thickness of the drawn carbon nanotube film ranges from about 10 nanometers to about 500 nanometers.

15. A method for adjusting a focal length of a liquid lens comprising a sealed shell, a liquid material, a carbon nanotube structure, a first electrode and a second electrode; the liquid material and the carbon nanotube structure are sealed inside the sealed shell and in contact with each other, the first electrode and the second electrode are electrically connected to the carbon nanotube structure and separated from each other by the carbon nanotube structure, and the liquid material comprises only a single liquid; wherein the liquid lens further comprises a gaseous material sealed inside the sealed shell, and the gaseous material occupies approximately 10% to approximately 50% of a total volume inside the sealed shell; and the method comprising:

heating the liquid material by applying a voltage to the carbon nanotube structure.

16. The method of claim 15, wherein the liquid material is a solution of non-electrolyte, water, or organic solvent.

17. The method of claim 15, wherein the liquid material is pure water.

18. The method of claim 15, wherein the liquid material is methanol, ethanol or acetone.

19. The method of claim 15, wherein carbon nanotube structure is a carbon nanotube film immersed in the liquid material so that the liquid material is located on both side of the carbon nanotube film.

* * * * *